United States Patent [19]

Iwama et al.

[11] 4,391,419
[45] Jul. 5, 1983

[54] SPINNING REEL BRAKE

[75] Inventors: Shinichi Iwama; Takashi Egasaki, both of Higashikurume, Japan

[73] Assignee: Daiwa Seiko Inc., Tokyo, Japan

[21] Appl. No.: 281,641

[22] Filed: Jul. 9, 1981

[30] Foreign Application Priority Data

Aug. 29, 1980 [JP] Japan .................... 55-122524

[51] Int. Cl.³ .............................. A01K 89/02
[52] U.S. Cl. ................................. 242/84.5 A
[58] Field of Search .............. 242/84.5 A, 84.51 A, 242/84.5 R, 84.51 R, 84.21 R

[56] References Cited

U.S. PATENT DOCUMENTS

| | | | |
|---|---|---|---|
| 2,676,769 | 4/1954 | Sarah | 242/84.21 R |
| 2,734,693 | 2/1956 | Rabezzana | 242/84.5 A |
| 2,863,617 | 12/1958 | Chapin et al. | 242/84.5 A |
| 2,901,193 | 8/1959 | Askins et al. | 242/84.21 R |
| 3,025,020 | 3/1962 | Sarah | 242/218 |
| 3,074,664 | 1/1963 | Beger | 242/84.5 R |
| 3,097,814 | 7/1963 | Sarah | 242/218 |
| 3,810,592 | 5/1974 | Host | 242/84.51 A |

*Primary Examiner*—Billy S. Taylor
*Attorney, Agent, or Firm*—Browdy and Neimark

[57] ABSTRACT

A drag adjusting device of spinning reel for fishing. The device has a cylinder projecting rearwardly from a reel housing and provided with an axial groove and stopper projection formed on its inner and outer peripheral surfaces, respectively. A spool slide shaft having the spool fixed to one end thereof projects into the cylinder from the bottom of the latter. The device further has a braking member consisting of two washers fitted to the spool slide shaft. One of the washers is adapted to rotate as a unit with the spool slide shaft, while the other fits the axial groove of the cylinder and, hence, is not rotatable. An adjusting cylinder is screwed to the outer end opening of the cylinder so as to be able to move back and forth with respect to the latter as it is rotated. The braking member is pressed by a spring acting between the inner bottom surface of the adjusting sleeve and the rear end surface of the braking member. A handle sleeve is fitted to the adjusting sleeve such that its rotational position relatively to the latter is variable. The handle sleeve is provided at its inner peripheral surface with an engaging projection adapted to engage the stopper projection of the cylinder to limit the rotation of the handle sleeve relative to the cylinder.

4 Claims, 6 Drawing Figures

000
SPINNING REEL BRAKE

BACKGROUND OF THE INVENTION

The present invention relates to an improvement in the drag adjusting device of a spinning reel for fishing.

The drag braking force for braking the spool against slipping is selected in accordance with various factors such as the size of the fishline, kind of the fish, size of the fish and so forth. Conventional adjusting system incorporates a braking member which is pressed by a screw feeding action to provide a wide range of adjustment of the braking force from the strong braking which does not permit the spool to rotate to no braking in which no braking force is applied to the spool.

Practically, however, such a wide range of adjustment is not required because, in the actual use, the fishline meeting the aimed fish is wound round the spool. Rather, such a wide range of adjustment of braking force tends to cause an erroneous operation of the adjusting handle due to excessive tightening or loosening of the adjusting handle, if the fisher concentrates his attention to the water surface or rod and adjusts the adjusting handle only through feeling. In addition, an excessive loosening of the adjusting handle reduces the resistance against rotation and, accordingly, is liable to be dropped during transportation or handling so as to be lost in the water or in the bush around the fishing spot.

SUMMARY OF THE INVENTION

Accordingly, an object of the invention is to provide a spinning reel which permits a free setting of adjustable range of the drag braking force beforehand in accordance with the size of the fishline, kind of the fish and the size of the fish, so that the user can use the spinning reel with optimum adjustable range of drag braking force.

Another object of the invention is to provide a spinning reel which permits, once the range of the drag braking force is set, the drag braking force is adjusted within one full rotation of the adjusting handle to avoid unnecessary rotation of the adjusting handle, thereby to make even the beginner to avoid erroneous operation attributable to the excessive tightening or loosening of the handle while avoiding accidental dropping of the adjusting handle due to excessive loosening.

Still another object of the invention is to provide a spinning reel in which the change of adjustable range of the drag braking force can be made easily and promptly without necessitating the demounting of the adjusting handle.

To these ends, according to one aspect of the invention, there is provided a drag adjusting device for a spinning reel comprising: a bottom-equipped cylinder rearwardly projecting from a housing of a spinning reel and provided at its inner peripheral surface with an axial groove and at its outer peripheral surface with a stopper projection; a spool slide shaft having a spool fixed to the end thereof and projecting into the cylinder from the bottom of the latter; a braking member consisting of a washer fitting the spool slide shaft within the cylinder and rotatable as a unit with the spool slide shaft and a non-rotatable washer fitting the spool slide shaft and engaging the groove of the cylinder; an adjusting sleeve screwed to the outer end opening of the cylinder so as to be able to move back and forth in relation to the latter; a spring acting between the inner bottom surface of the adjusting cylinder and the rear end surface of the braking member and adapted to press the braking member; a handle sleeve fitted to the adjusting sleeve in such a manner as to be able to adjust the circumferential position thereof; and an engaging projection formed on the inner peripheral surface of the handle sleeve and adapted to engage the stopper projection thereby to limit the rotation of the handle.

The above and other objects, as well as advantageous features, of the invention will become more apparent from the following description of the preferred embodiment taken in conjunction with the accompanying drawings.

DESCRIPTION OF THE PREFERRED EMBODIMENTS

Figure 1:
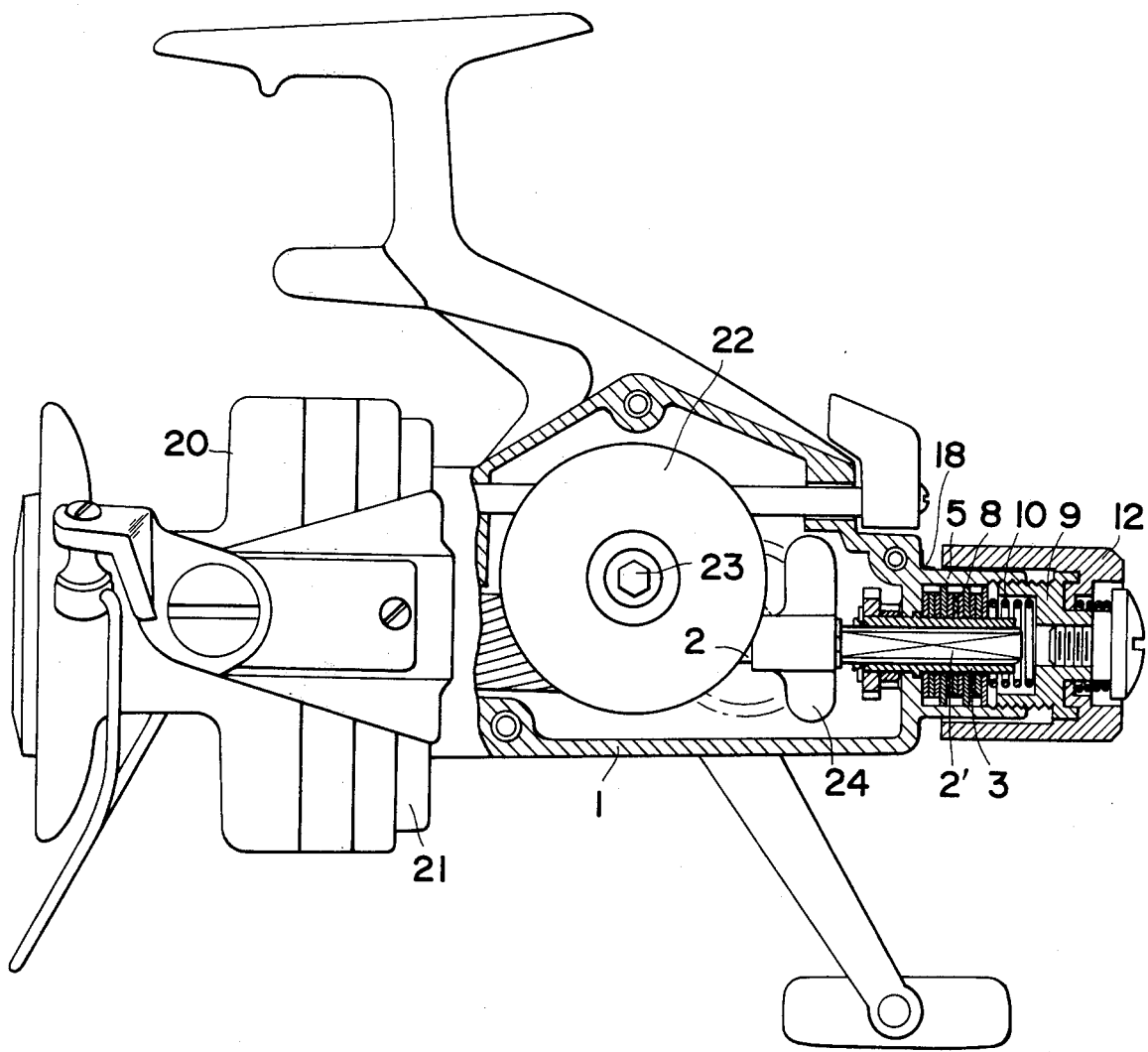
FIG. 1 is a partly cut-away front elevational view of an embodiment of the invention.

Referring to the drawings, a housing 1 of the spinning reel rotatably supports a sleeve 3 which is fitted to a spline 2' of a spool slide shaft 2 in such a manner as to be able to slide in the axial direction relatively to the spool slide shaft 2 but to rotate as a unit with the latter. A washer 4 fixedly engages with the sleeve 3. Another washer 7 is rotatable relatively to the sleeve 3 but is engaged by a groove 6 formed in the inner peripheral surface of a cylinder 5 projected from the housing 1. These washers 4 and 7 in combination constitute a drag washer 8. An adjusting sleeve 9 is screwed to the cylinder 5 in such a manner as to be moved back and forth relatively to the latter as it is rotated. A spring 10 is disposed to act between the adjusting sleeve 9 and the rear end surface of the drag washer 8. The arrangement is such that, as the adjusting sleeve 9 is rotated to move axially relatively to the cylinder, the drag washer 8 is pressed against the inner bottom surface of the cylinder 5 at a variable pressure.

A hub 11 is formed as a unit with the adjusting sleeve 9 to project from the rear end of the latter. A handle sleeve 12 formed to cover the outside of the cylinder 5 fits at its bottom to the hub 11 axially movably. A spring 14 acts between the handle sleeve 12 and the head 13' of a screw 13 screwed to the hub 11 so as to urge the handle sleeve 12 forwardly. A pair of projections 15,15 are formed to project rearwardly from the outer peripheral surface of the adjusting sleeve 9 and so as to oppose diametrically to each other. These projections 15,15 are adapted to engage two diametrically opposing recesses 16,16 among a multiplicity of recesses 16,16,16 . . . formed along a circle in the inner bottom surface of the handle sleeve 12. A stopper projection 17 and an engaging projection 17' are formed, respectively, on the outer surface of the cylinder 5 and the inner peripheral surface of the handle sleeve 12 so that the handle sleeve 12 can make only one full rotation re-atively to the cylinder 5.

A mark 18 representing the braking starting point is formed on the base portion of the cylinder 5, while a scale 19 representing the amount of braking is formed on the front end peripheral surface of the handle sleeve 12.

In the drawings, a reference numeral 20 denotes a spool fixed to the end of the spool shaft 2, 21 denotes a rotor for winding the fishline around the spool 20, 22 denoted a drive gear for driving the rotor 21, 23 denotes a handle shaft for rotatably driving the drive gear 22 and 24 denotes a member for the sliding movement of the spool shaft 2. These members are substantially identical to those incorporated in the known devices.

Figure 2:
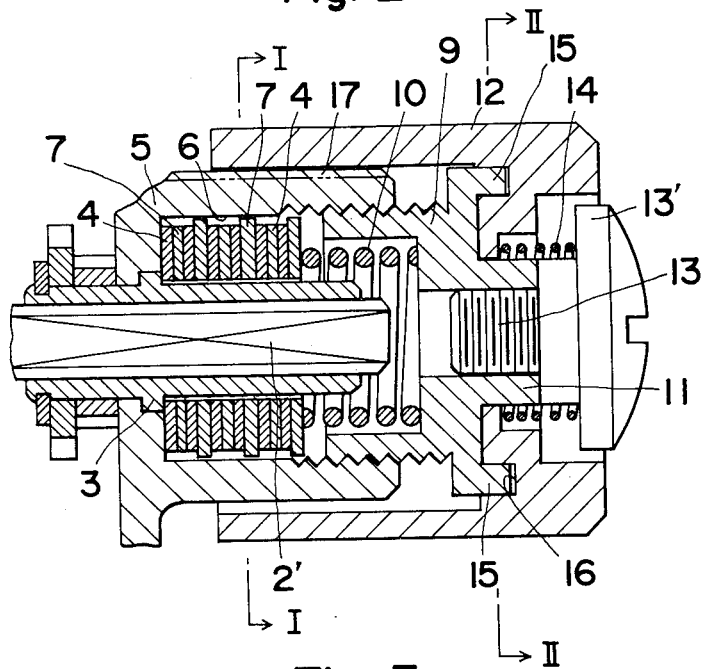
FIG. 2 is a vertical sectional front elevational view of an essential part of the embodiment shown in FIG. 1.
Figure 3:
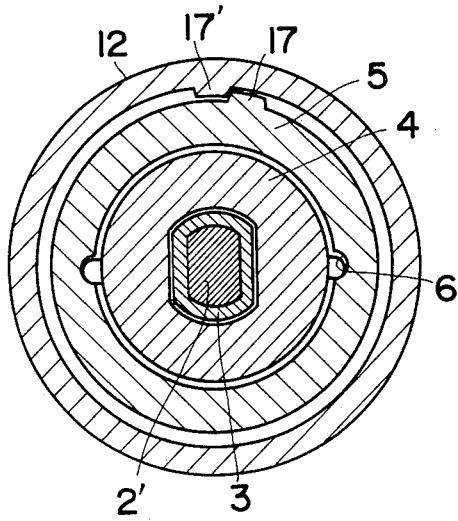
FIGS. 3 and 4 are sectional views taken along the lines I—I and II—II of FIG. 2.

In use, as the handle sleeve 12 is rotated in the counter-clockwise direction from the position shown in FIG. 3, the adjusting sleeve 9 screwed to the cylinder 5 is retracted rightwardly as viewed in FIG. 2, so that the pressure exerted through the spring 10 on the drag washer is progressively decreased. The drag braking force becomes minimum when the handle sleeve has made almost one full rotation to bring the engaging projection 17' thereof into contact with the stopper projection 17.

The range of adjustment of drag braking force can be changed in accordance with the size of the fishline, kind and size of the fish and other factors in a manner explained hereinunder.

Figure 4:
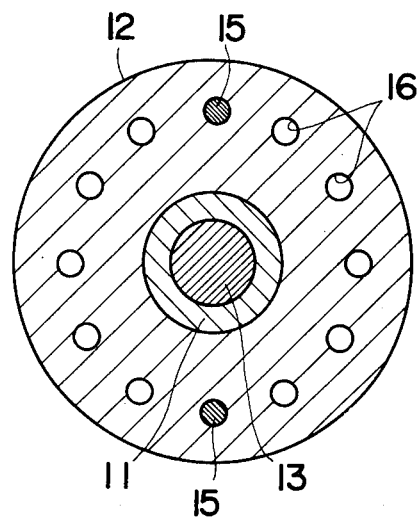
Figure 5:
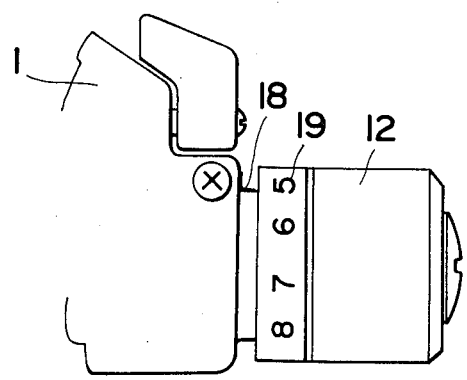
FIG. 5 is a front elevational view of the essential part.
Figure 6:
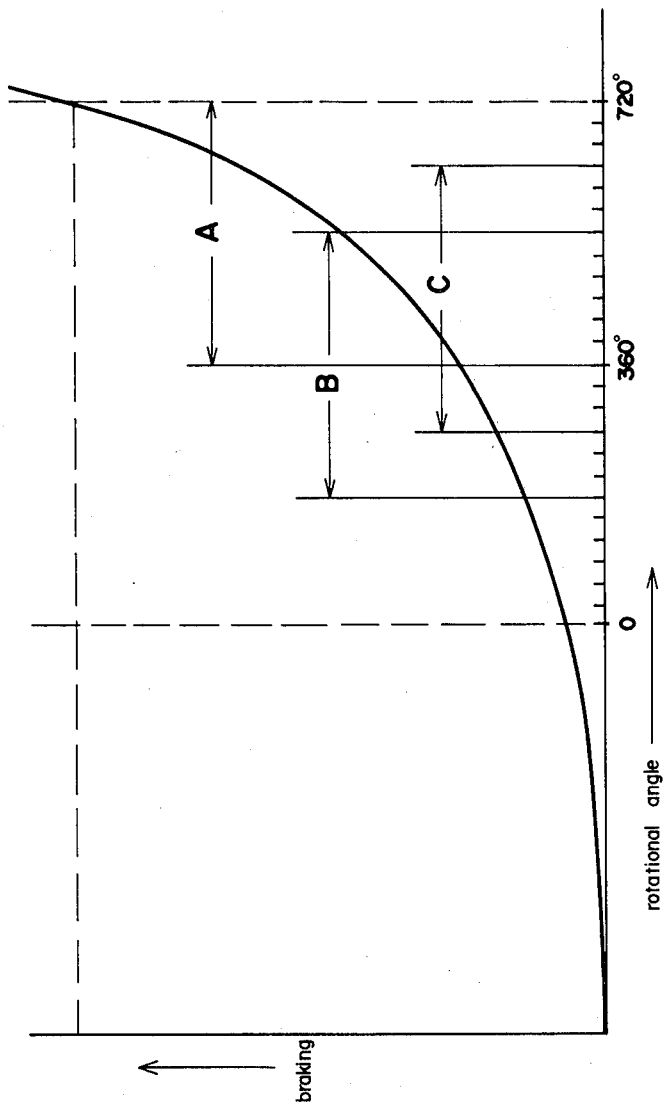
FIG. 6 is a diagram showing the adjustable ranges of drag braking force in the embodiment of the invention.

Assume here that the drag braking force is changed following the curve shown in FIG. 6 in relation to the rotation of the adjusting sleeve 9, and that the handle sleeve 12 has 12 (twelve) recesses formed at 30° interval as shown in FIG. 4. It will be seen that, by withdrawing the handle sleeve 12 overcoming the force of the spring 14 rearwardly and changing the recesses 12 engaged by the projections 15 of the adjusting sleeve, it is possible to select the ranges of adjustment of the braking force as ranges A,B,C shown in FIG. 6.

In the embodiment heretofore described, the projections 15,15 are formed on the adjusting sleeve 9, while the recesses 16,16,16 . . . are formed in the handle sleeve 12. This arrangement may, needless to say, be reversed. Namely, it is possible to form the projections 15,15 on the handle sleeve 12 while forming the recesses 16,16,16 . . . in the adjusting sleeve 9.

Although the invention has been described through specific terms, it is to be noted that the described embodiment is not exclusive, and various changes and modifications may be imparted thereto without departing from the spirit or scope of the invention which is limited solely by the appended claims.

What is claimed is:

1. A drag adjusting device for a spinning reel comprising: a cylinder rearwardly projecting from a housing of a spinning reel and provided at its inner peripheral surface with an axial groove; a spool slide shaft having a spool fixed to the end thereof and projecting into said cylinder through the the bottom end of said cylinder; a braking member comprising a washer fitting said spool slide shaft within said cylinder and rotatable as a unit with said spool slide shaft and a non-rotatable washer fitting said spool slide shaft and engaging said groove of said cylinder; an adjusting sleeve screwed to the outer end opening of said cylinder so as to be able to move back and forth relatively to the latter; a spring acting between the inner bottom surface of said adjusting sleeve and the rear end surface of said braking member and adapted to press said braking member to provide a drag braking force, a handle sleeve coaxially positioned about said adjusting sleeve, said adjusting sleeve and said handle sleeve together defining two cooperating members which are circumferentially adjustable relative to each other to provide a plurality of different ranges of drag braking force, said adjusting sleeve having a range of movement relative to said cylinder corresponding to each of said plurality of ranges of drag braking force, one of said cooperating members being provided with projection means and the other of said cooperating members being provided with a plurality of circumferentially spaced recess means, whereby to permit said adjusting sleeve to be detached from said handle sleeve when in one circumferential position relative to said handle sleeve and to be re-attached to said handle sleeve when in another circumferential position relative to said handle sleeve, and thus whereby to position said adjusting sleeve relative to said cylinder and to said spring to provide a different desired range of drag braking force in said another circumferential position than in said one circumferential position, and cooperating means carried by said cylinder and by said handle sleeve to limit the rotation of said handle sleeve to not more than one rotation of said handle sleeve in any one of said ranges.

2. A drag adjusting device for a spinning reel as defined in claim 1 in which said cooperating means carried by said cylinder and by said handle sleeve to limit the rotation of said handle sleeve comprises a stopper projection on the outer peripheral surface of said cylinder and an engaging projection formed on the inner peripheral surface of said handle sleeve.

3. A drag adjusting device for a spinning reel as defined in claim 1 in which said adjusting sleeve has a hub projecting from the rearward end thereof, and in which said handle sleeve is coaxially and rotatably positioned about said hub and also about said cylinder, and additional spring means coaxially positioned about said hub and engaging a rearwardly facing portion of said handle sleeve for biasing said handle sleeve toward said adjusting sleeve whereby to maintain said projection means in engagement with said recess means.

4. A drag adjusting device for a spinning reel as claimed in any one of the claims 1, 2 or 3, wherein a mark representing a braking starting point is provided on the upper face of the base portion of said cylinder, while a braking scale is formed on the outer peripheral surface of the end portion of said handle sleeve.

* * * * *